(No Model.)  2 Sheets—Sheet 1.
C. WILLIAMS.
DISK HARROW.
No. 462,289.  Patented Nov. 3, 1891.
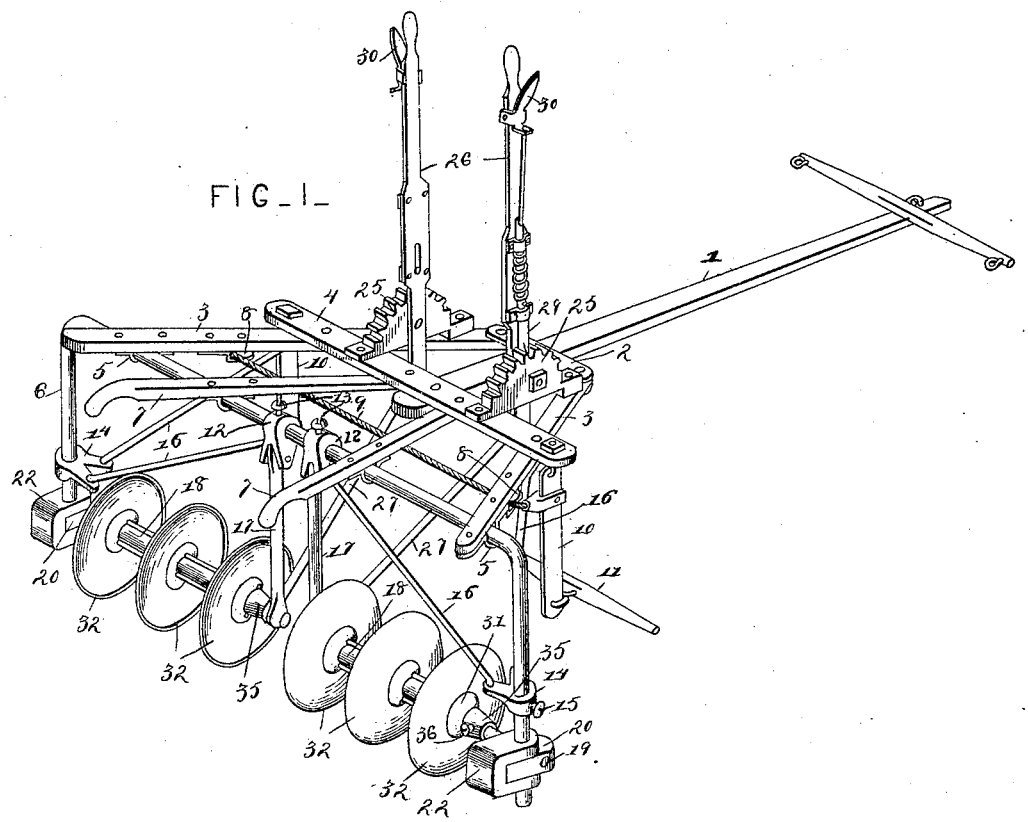
FIG. 1.
FIG. 5.
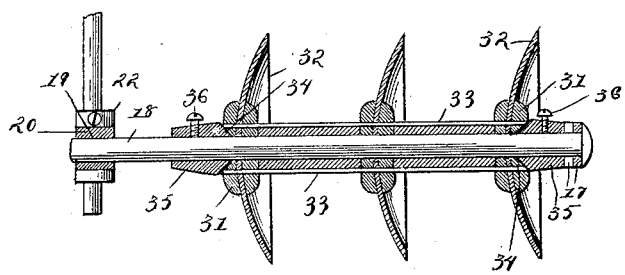
Witnesses:
Geo. E. Frech.
W. S. Duvall.
Inventor
Carpenter Williams
By his Attorneys,
C. A. Snow & Co.

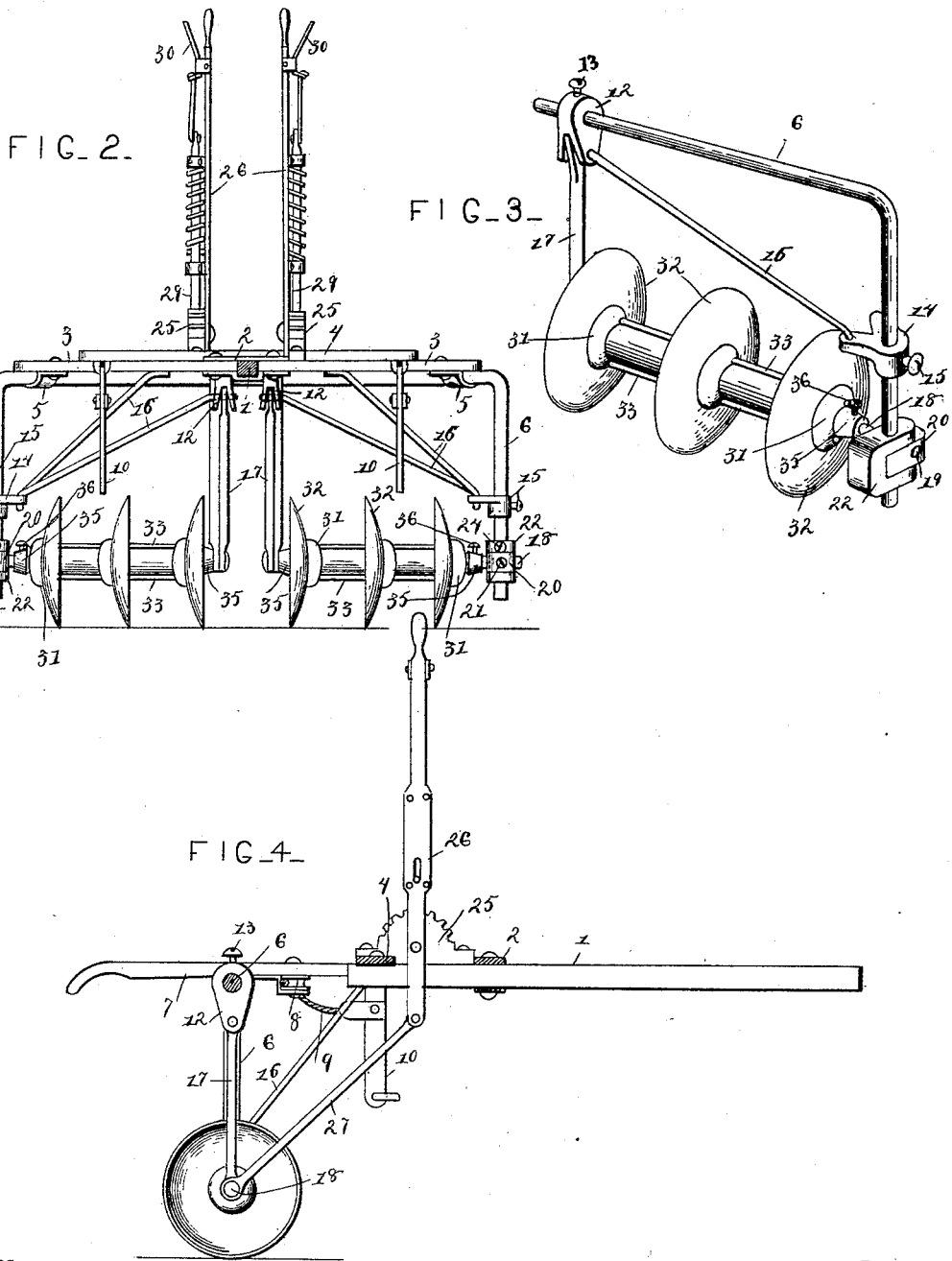

UNITED STATES PATENT OFFICE.

CARPENTER WILLIAMS, OF KENTLAND, INDIANA.

DISK HARROW.

SPECIFICATION forming part of Letters Patent No. 462,289, dated November 3, 1891.

Application filed February 26, 1891. Serial No. 382,858. (No model.)

*To all whom it may concern:*

Be it known that I, CARPENTER WILLIAMS, a citizen of the United States, residing at Kentland, in the county of Newton and State of Indiana, have invented a new and useful Disk Harrow, of which the following is a specification.

This invention relates to improvements in disk harrows for cultivating at each side of rows of corn and other plants.

The objects of the invention are to provide a disk harrow of the above class adapted to be adjusted so as to penetrate the soil at different depths, to throw the dirt toward or away from the plants, to be constructed in a simple economical manner, and to be of light and easy draft.

Other objects and advantages of the invention will appear in the following description, and the novel features thereof will be particularly pointed out in the claims.

Referring to the drawings, Figure 1 is a perspective of a harrow constructed in accordance with my invention. Fig. 2 is a transverse section looking toward the harrow-disks. Fig. 3 is an enlarged detail in perspective of one-half of the harrow-disk-supporting frame or arch, together with the disks. Fig. 4 is a vertical longitudinal section. Fig. 5 is a longitudinal section through one of the harrow-axles and series of disks.

Like numerals of reference indicate like parts in all the figures of the drawings.

1 designates the draft-pole of the harrow, to which by means of metal straps 2 are connected the opposite diverging side bars 3, traversed by the transverse draft-bar 4, all securely bolted together. Connected by suitable clips 5 to the rear ends of the side bars 3 is an inverted-U-shaped arch 6, to which is clipped a pair of handles 7, extending rearwardly over the arch and having their front ends secured to the draft-bar.

Loose pulleys 8 are pivoted rotatably under the bars 3, and a draft chain or cable 9 passes around the pulleys and is connected at its terminals to a pair of depending draft-links 10, loosely connected at the upper ends to the outer ends of the draft-bar 4, and having loosely connected at their lower ends singletrees 11.

A pair of bifurcated and perforated collars 12 is mounted upon the arch 6 between the handles, and set-screws 13 serve to adjust the same. A triangular bracket-casting 14 is mounted upon each of the terminals of the arch, is made adjustable by set-screws 15, and have connected to perforations in said castings the lower ends of pairs of diverging braces 16. One brace of each pair is bolted to the under side of a side bar 3, while the remaining or rear brace is connected to and passes through the diverging bifurcations of the adjustable collar-castings 12 and have depending from between said bifurcations loose hanging rods 17, terminating at their lower ends in eyes for the reception of the inner ends of a pair of axles 18. The axles 18 have their outer ends entered in perforations 19, formed in collars 20, and said axles are adjustable therein by means of binding-screws 21, passing through the collars and impinging upon the axles. The collar-castings 20 are supported in the adjusted position by means of a recessed yoke-casting 22, in the recess of which the collar-casting is seated, and said yoke is adjustable by means of set-screws 24, passing through the same and impinging upon the arch 6. It will be obvious that by raising and lowering the yoke-castings the outer ends of the axles may be raised and lowered accordingly.

To opposite toothed sectors 25, located upon the frame-work of the harrow, there are pivoted a pair of hand-levers 26, the lower ends of which extend below said sectors, and each by a connecting-rod 27 is connected to the inner end of an axle. The levers are also provided with spring-actuated locking-bolts 29, operated by bell-crank levers 30, and by the same drawn out of their normally-engaged position with the teeth of the sectors. By manipulating these levers it will be obvious that the axles may be swung to the front or to the rear, and will also be slightly raised and lowered.

Sleeves 31 are mounted upon the axles, and each sleeve has rigidly fixed therein a series of concavo-convex harrow-disks 32, the series being braced and rigidly connected by opposite rods 33. Space-blocks are also interposed between each pair of disks. The ends of the sleeves are countersunk or made conical, as at 34, and they take bearing upon the inner ends of pairs of opposite collars 35, mounted upon the axles, having conical inner ends, and made adjustable by set-screws 36. It will be observed that these cutting-disk axles may be elevated and depressed at their outer ends, so as to cut deep or shallow near the plant or away from the same, that they may be so disposed as to throw the dirt toward the plant or away from the same, and all by an easy manipulation of certain parts.

Having described my invention, what I claim is—

1. In a harrow of the class described, the combination, with the frame-work and the arch, of the opposite axles, vertically adjustable, hinged connections for attaching the axles to the arch, harrow-disks mounted upon the axles, loosely-depending rods connecting the arch with the inner ends of the axles, and a pair of levers loosely connected with the inner ends of the axles for swinging the latter, and means for locking the levers, substantially as specified.

2. In a harrow of the class described, the combination, with the frame-work and the arch, of the recessed castings 22, mounted upon the arch, the perforated ears 20, also mounted upon the arch within said recesses of the castings, adjusting-screws for the castings 22, the axles mounted in the perforations of the ears, bifurcated collar-castings 12, mounted upon the arch at each side of the center thereof, bolts for adjusting the same, rods 16, pivotally and loosely suspended from said collar-castings and terminating in eyes for the reception of the axles, harrow-disks mounted on the axles, pivoted levers mounted on the frame-work, rods 17, connecting the same with the inner ends of the axles, and means for locking said levers, substantially as specified.

3. In a harrow of the class described, the combination, with the axles and supports for the same, of opposite pairs of conically-ended bearing-collars 35, mounted in the axle, means for adjusting the same, the rotatable sleeves 31, mounted upon the axles and having conical bearing ends resting on the collars, and harrow-disks mounted on said sleeves and rigidly connected therewith, substantially as specified.

In testimony that I claim the foregoing as my own I have hereto affixed my signature in presence of two witnesses.

CARPENTER WILLIAMS.

Witnesses:
 THOMAS SEART,
 FRANK A. COMPARET.